(12) United States Patent
Nabeto et al.

(10) Patent No.: US 9,143,050 B2
(45) Date of Patent: Sep. 22, 2015

(54) VOLTAGE CONVERTING CIRCUIT AND ELECTRONIC DEVICE

(75) Inventors: Misato Nabeto, Ikoma (JP); Kenji Sakurrai, Kizugawa (JP); Tatsuakira Masaki, Nara (JP); Hiroshi Sameshima, Nara (JP); Hiroshi Tsuji, Kyoto (JP)

(73) Assignee: OMRON Corporation, Kyoto (JP)

( * ) Notice: Subject to any disclaimer, the term of this patent is extended or adjusted under 35 U.S.C. 154(b) by 345 days.

(21) Appl. No.: 13/699,426

(22) PCT Filed: Mar. 16, 2011

(86) PCT No.: PCT/JP2011/056279
§ 371 (c)(1),
(2), (4) Date: Mar. 4, 2013

(87) PCT Pub. No.: WO2012/002007
PCT Pub. Date: Jan. 5, 2012

(65) Prior Publication Data
US 2013/0201742 A1    Aug. 8, 2013

(30) Foreign Application Priority Data
Jul. 2, 2010 (JP) ................................. 2010-152436

(51) Int. Cl.
*H02M 3/06* (2006.01)
*H02M 7/04* (2006.01)
*H02M 3/07* (2006.01)

(52) U.S. Cl.
CPC *H02M 7/04* (2013.01); *H02M 3/07* (2013.01); *H02M 2003/072* (2013.01)

(58) Field of Classification Search
CPC .................................. H02M 7/04; H02M 3/07
USPC ............................. 363/62, 140; 327/520, 521
See application file for complete search history.

(56) References Cited

U.S. PATENT DOCUMENTS

| | | | |
|---|---|---|---|
| 5,894,214 A * | 4/1999 | Jiang | 323/222 |
| 7,888,819 B2 * | 2/2011 | Lee | 307/65 |
| 2003/0197554 A1 * | 10/2003 | Sim | 327/589 |
| 2006/0028849 A1 | 2/2006 | Ogata et al. | |
| 2011/0254514 A1 * | 10/2011 | Fleming | 320/166 |
| 2012/0112724 A1 * | 5/2012 | Nishida | 323/293 |

FOREIGN PATENT DOCUMENTS

| | | |
|---|---|---|
| JP | 50-150824 A | 12/1975 |
| JP | 2001-057774 A | 2/2001 |

(Continued)

OTHER PUBLICATIONS

Internationa Search Report Application No. PCT/JP2011/056279, maild on Jun. 14, 2011.

*Primary Examiner* — Matthew Nguyen
(74) *Attorney, Agent, or Firm* — Nutter McClennen & Fish LLP; John J. Penny, Jr.

(57) ABSTRACT

A voltage converting circuit includes a plurality of first capacitors that are charged by a power source, a second capacitor, connected in parallel to the plurality of first capacitors, which is able to be charged to a voltage that is supplied to a load circuit, and a plurality of switching circuits, provided in such a way as to correspond to the plurality of first capacitors, each of which switches states of connection between its corresponding first capacitor and the second capacitor. The first capacitors are sequentially connected to the second capacitor through the corresponding switching circuits as charging voltages of the first capacitors reach a predetermined connection voltage that is higher than a charging voltage of the second capacitor so that the first capacitors are not short-circuited with each other.

11 Claims, 8 Drawing Sheets

(56) References Cited

FOREIGN PATENT DOCUMENTS

| | | |
|---|---|---|
| JP | 2005-130624 A | 5/2005 |
| JP | 2005-198453 A | 7/2005 |
| JP | 2006-067783 A | 3/2006 |
| JP | 2009-124807 A | 6/2009 |
| JP | 2010-130557 A | 6/2010 |

* cited by examiner

First voltage ratio
(= total charging voltage of first capacitor group/open-end voltage of vibration electric power generation device)

First voltage ratio

First voltage ratio

Capacity of first capacitor : 10 μF
Capacity of second capacitor : 10 μF

| Voltage of first capacitor (V) | | Voltage of second capacitor (V) | | Voltage ratio (%) | Charge-transfer efficiency (%) |
| --- | --- | --- | --- | --- | --- |
| Initial phase | Terminal phase | Initial phase | Terminal phase | | |
| 10.0 | 5.0 | 0.0 | 5.0 | 0.0 | 33.3 |
| 10.0 | 7.5 | 5.0 | 7.5 | 50.0 | 71.4 |
| 10.0 | 9.0 | 8.0 | 9.0 | 80.0 | 89.5 |
| 10.0 | 9.5 | 9.0 | 9.5 | 90.0 | 94.8 |

(b)

Capacity of first capacitor : 1 μF
Capacity of second capacitor : 10,000,000 μF

| Voltage of first capacitor (V) | | Voltage of second capacitor (V) | | Voltage ratio (%) | Charge-transfer efficiency (%) |
| --- | --- | --- | --- | --- | --- |
| Initial phase | Terminal phase | Initial phase | Terminal phase | | |
| 10.0 | 0.000010 | 0.0 | 0.000010 | 0.0 | 0.0 |
| 10.0 | 5.000001 | 5.0 | 5.000001 | 50.0 | 66.7 |
| 10.0 | 8.000001 | 8.0 | 8.000001 | 80.0 | 88.9 |
| 10.0 | 9.000001 | 9.0 | 9.000001 | 90.0 | 94.7 |

Fig. 5
(a)
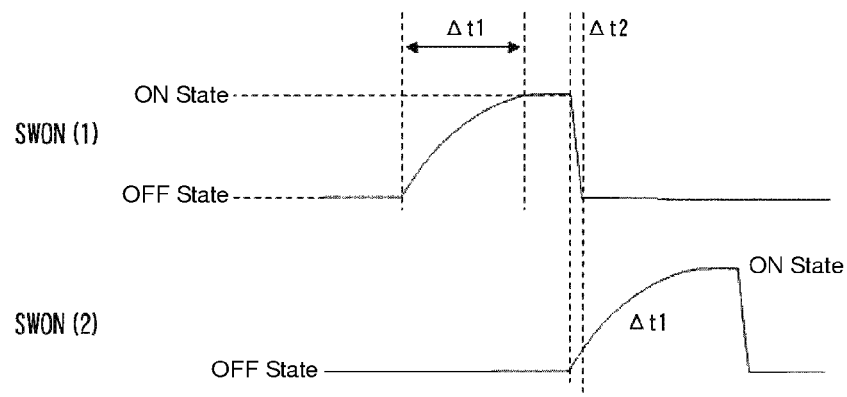
(b)
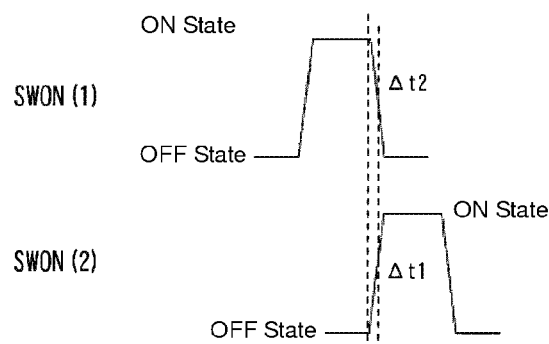

Fig. 7
(a)
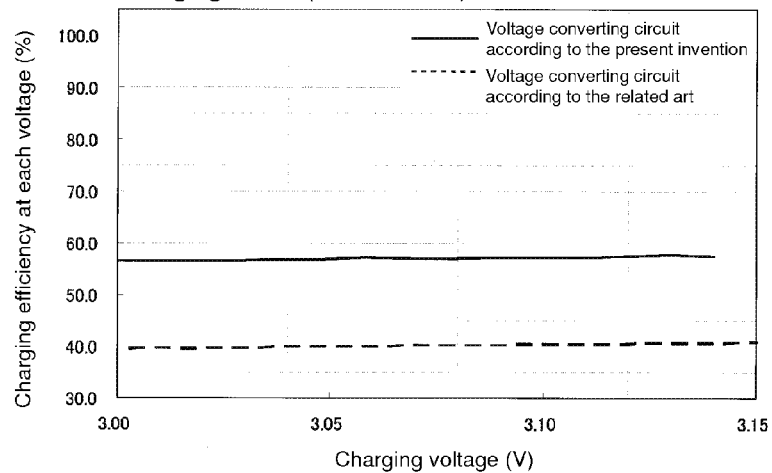
(b) <Voltage converting circuit according to the related art>
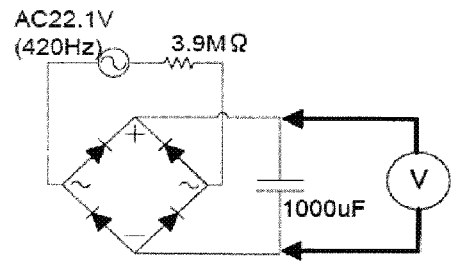

VOLTAGE CONVERTING CIRCUIT AND ELECTRONIC DEVICE

TECHNICAL FIELD

The present invention relates to a voltage converting circuit causing an output voltage of an AC power source to step down to a voltage that is supplied to a load circuit, and an electronic device including the same.

BACKGROUND ART

In keeping with a recent trend of energy saving, attention has been given to environmental energy that does not depend on fossil fuel or the like and exists ordinarily. Photovoltaic energy, wind energy and the like have been widely known as environmental energy. In addition, vibration energy existing around ordinarily can be mentioned as environmental energy having an energy density which is not inferior to that of the foregoing energy. In order to supply, to a load circuit, electric power generated from this vibration energy by an electric power generation device, heretofore, a circuit for converting a voltage so as to be suitable for the load circuit has been under study with regard to improvement in its conversion efficiency.

For example, there has been disclosed a technique of preventing reduction in voltage conversion efficiency in consideration of a fact that it becomes difficult to realize a desired voltage drop because of output impedance of a vibration electric power generation device (refer to Patent Document 1). According to this technique, switching circuits are provided for switching, between series connection and parallel connection, states of connection of a plurality of capacitors to a power source circuit and a load circuit. Thus, the number of capacitors to be connected by the switching circuits is controlled on the basis of an input voltage from the power source circuit or a frequency of the input voltage. Moreover, Patent Document 2 discloses a technique for efficiently generating electric power from small-amplitude vibrations. According to this technique, the ON/OFF control of a switch for controlling an electric power output from a vibration electric power generation device is carried out on the basis of a cycle of vibrations, so that an electric power output cycle is varied.

PRIOR ART DOCUMENTS

Patent Documents

Patent Document 1: Japanese Unexamined Patent Publication No. 2009-124807
Patent Document 2: Japanese Unexamined Patent Publication No. 2005-130624
Patent Document 3: Japanese Unexamined Patent Publication No. 2005-198453

SUMMARY OF THE INVENTION

Problems to be Solved by the Invention

In a case of stepping down an output voltage of an AC power source by charging a plurality of capacitors connected in series once with the output voltage of the AC power source and then simultaneously supplying the charged energy in these capacitors to a load circuit connected in parallel to the capacitors, when the capacitors are different in capacity from each other, it is difficult to maintain efficiency of electric power supply from the capacitors to the load circuit at an optimum state because of an influence of the difference. Typically, it is difficult to exactly adjust capacitors to be equal in capacity to each other. According to the related art, therefore, it is difficult to maintain electric power supply efficiency at a suitable state.

The present invention has been devised in view of the foregoing problems, and an object thereof is to provide a voltage converting circuit for bringing voltage conversion efficiency in a case of stepping down an output voltage of an AC power source to a voltage that is supplied to a load circuit into a suitable state as soon as possible.

Means for Solving the Problems

According to the present invention, in order to solve the foregoing problems, a voltage converting circuit to be provided between an AC power source and a load circuit includes a plurality of first capacitors that are charged by the power source, and a second capacitor to which the first capacitors charged to a state higher than a charging voltage of the second capacitor are individually and sequentially connected. Thus, the second capacitor is charged with good efficiency.

More specifically, the present invention provides a voltage converting circuit including: a plurality of first capacitors that are charged by a power source; a second capacitor, connected in parallel to the plurality of first capacitors, which is able to be charged to a voltage equal to a voltage that is supplied to a load circuit; a plurality of switching circuits, provided in such a way as to correspond to the plurality of first capacitors respectively, each of which switches states of connection between its corresponding first capacitor and the second capacitor; and a connection control circuit for sequentially connecting the first capacitors to the second capacitor through the corresponding switching circuits as charging voltages of the first capacitors reach a predetermined connection voltage that is higher than a charging voltage of the second capacitor, and for controlling a state of connection of each of the first capacitors to the second capacitor so that the first capacitors are not short-circuited with each other.

In the voltage converting circuit, the plurality of first capacitors are charged by the power source, and the charging voltages of the first capacitors correspond to distributed or divided output voltages of the power source in accordance with capacities of the first capacitors. Herein, all the capacities of the plurality of first capacitors may be identical with each other. Alternatively, the capacities of part of or all the first capacitors may be different from each other. The term "identical" used herein as to the capacities of the capacitors refers a so-called nominal value, and therefore does not take variations in capacity based on individual differences of the capacitors into consideration.

The plurality of first capacitors are connected to the second capacitor through the switching circuits corresponding to the first capacitors respectively. That is, each of the first capacitors is individually connected to or disconnected from the second capacitor through its corresponding switching circuit. In the voltage converting circuit according to the present invention, the second capacitor may be configured to include one capacitor or a plurality of capacitors. It is important herein to adopt the configuration that the second capacitor is connected to or disconnected from the plurality of first capacitors through the switching circuits. It is only necessary to appropriately determine the number of capacitors with which the second capacitor itself is configured and to appropriately adopt a connection mode between the capacitors.

Herein, the connection or disconnection of each of the first capacitors to or from the second capacitor is controlled by the connection control circuit. In order to charge the second capacitor, the connection control circuit does not simultaneously connect all the plurality of first capacitors to the second capacitor, but determines, as a target to be connected to the second capacitor, the first capacitor of which charging voltage reaches the predetermined connection voltage that is higher than the charging voltage of the second capacitor. That is, the connection control circuit controls the connection or disconnection of the first capacitor to or from the second capacitor so as to realize suitable charging efficiency, in other words, suitable voltage conversion efficiency at the time of electrical-charging from the first capacitor to the second capacitor. As to the connection by the connection control circuit, further, the states of connection between the first capacitors and the second capacitor, each of which satisfies the foregoing conditions, are controlled so that the first capacitors are not short-circuited with each other for the following reason. That is, suitable electrical-charging to the second capacitor becomes difficult when the first capacitors are short-circuited with each other.

By the adoption of the configuration that the connection control circuit controls the states of connection between the first capacitors and the second capacitor in accordance with a correlation between the charging voltages of the plurality of first capacitors and the charging voltage of the second capacitor, even in the case where the variations in capacity of the first capacitors become relatively great, the connection to the second capacitor is controlled on the basis of the charging voltage of each of the first capacitors. Thus, it is possible to eliminate an influence due to the variations in capacity of the first capacitors from the electrical-charging to the second capacitor as soon as possible. By the control of the states of connection of the first capacitors so as to prevent the first capacitors from being short-circuited with each other, further, it is possible to realize electrical-charging of the second capacitor from the power source through the first capacitor and voltage conversion with suitable efficiency.

Effect of the Invention

It becomes possible to bring voltage conversion efficiency in a case of stepping down an output voltage of an AC power source to a voltage that is supplied to a load circuit into a suitable state as soon as possible.

BRIEF DESCRIPTION OF THE DRAWINGS

FIG. 4 is a diagram showing a correlation of efficiency of charge-transfer from the first capacitors to the second capacitor with regard to charging voltages of the first capacitors and the charging voltage of the second capacitor.

FIG. 5 is a diagram concerning time constants during connection and disconnection of the first capacitor to and from the second capacitor in a case where electrical-charging from a power source circuit to the second capacitor is carried out.

FIG. 7 is a diagram showing a correlation between the charging efficiency of the voltage converting circuit according to the present invention and the charging voltage of the second capacitor.

MODE FOR CARRYING OUT THE INVENTION

With reference to the drawings, hereinafter, description will be given of embodiments of a voltage converting circuit 1 according to the present invention. It is to be noted that configurations to be described in the following embodiments are merely illustrative; therefore, the present invention is not intended to be limited to the configurations in the embodiments.

Embodiment 1

Figure 1:
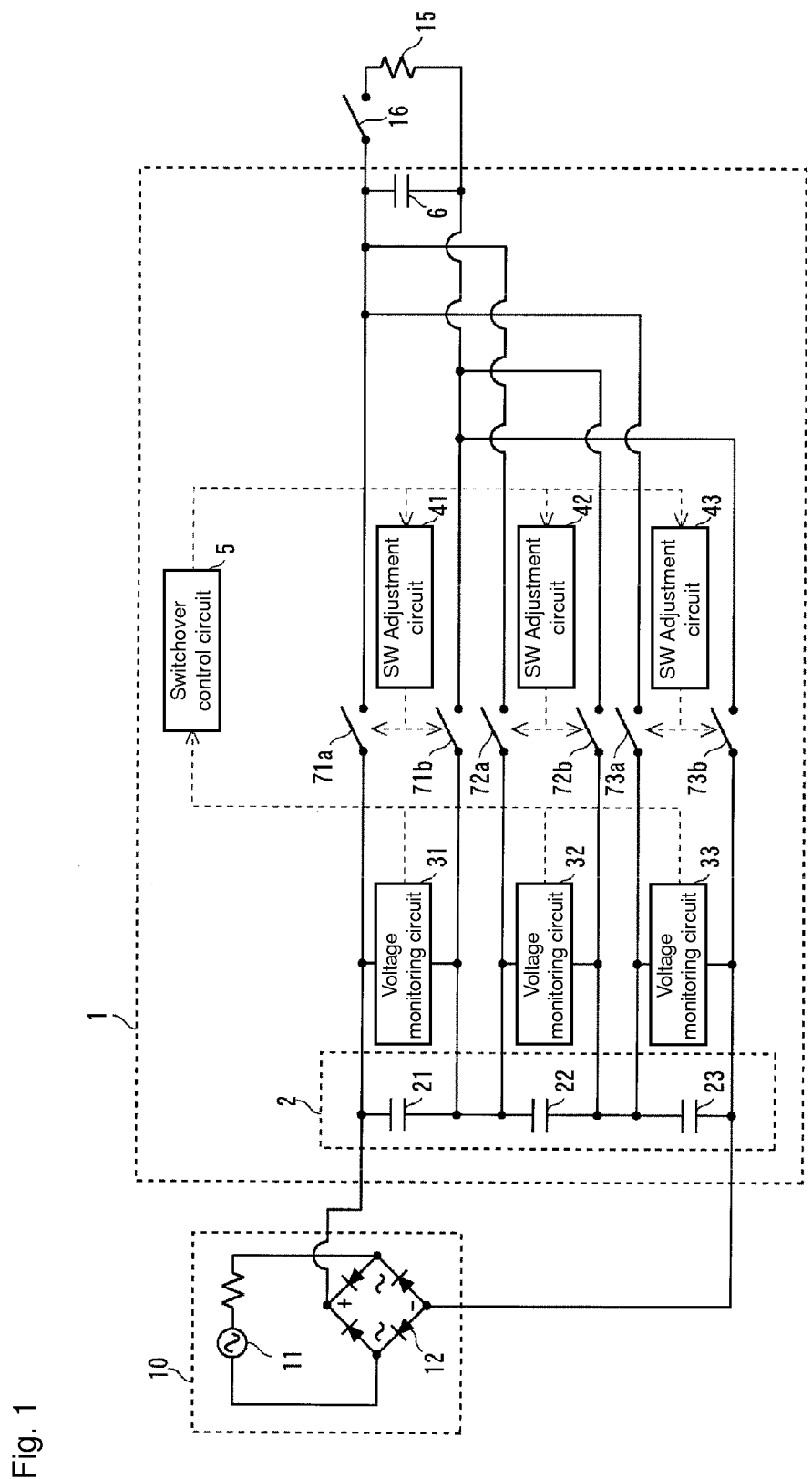
FIG. 1 is a diagram showing a schematic configuration of a voltage converting circuit according to the present invention.

FIG. 1 shows a schematic configuration of a voltage converting circuit 1 provided between a load circuit 15 and a vibration electric power generation device 11 that corresponds to an AC power source in the present invention and generates electric power with external vibrations used as a source. The voltage converting circuit 1 includes a second capacitor 6 that steps down an output voltage of the vibration electric power generation device 11 and accumulates the voltage as a drive voltage of the load circuit 15. Herein, a power source circuit 10 is configured with the vibration electric power generation device 11 and a rectification circuit 12 that rectifies a current of electric power generated by the vibration electric power generation device 11, and an output of the power source circuit 10 is input to the voltage converting circuit 1. Examples of the vibration electric power generation device 11 may include electric power generation devices utilizing an electret material. The vibration electric power generation device is publicly known in the related art; therefore, the detailed description thereof will not be given in the specification. Moreover, the power source circuit 10 may include an electric power generation device other than the vibration electric power generation device. The vibration electric power generation device adopted in this embodiment utilizes an electret material so as to have an electric power generation amount of 20 to 100 μW and an output voltage of 30 to 80 Vp-p; however, the application of the present invention is not limited to this device.

Further, a switching circuit 16 is provided between the voltage converting circuit 1 and the load circuit 15 to supply, to the load circuit 15, energy accumulated in the second capacitor 6 of the voltage converting circuit 1.

In the voltage converting circuit 1, an output terminal of the power source circuit 10 is connected to a first capacitor group 2 including a plurality of first capacitors connected in series, and an output of the output terminal is input to the first capacitors 21 to 23 in the first capacitor group 2. In this embodiment, the number of first capacitors to be included in the first capacitor group 2 is three, but is adjusted as appropriate in consideration of voltage conversion efficiency (charging efficiency) and the like as will be described later. It is assumed herein that the first capacitors 21 to 23 are equal in capacity to each other.

Moreover, wiring is carried out so that the second capacitor 6 is able to be connected in parallel to the three first capacitors 21 to 23 in the first capacitor group 2, and switching circuits are provided between the first capacitors and the second capacitor 6 in such a way as to correspond to the first capacitors respectively, and switch states of connection or disconnection of the first capacitors to or from the second capacitor 6. More specifically, the switching circuits 71a and 71b are provided between the first capacitor 21 and the second capacitor 6, the switching circuits 72a and 72b are provided between the first capacitor 22 and the second capacitor 6, and the switching circuits 73a and 73b are provided between the first capacitor 23 and the second capacitor 6. The switch operations of these switching circuits are individually controlled in accordance with charging voltages of the corresponding first capacitors, and the like, as will be described later, and switching adjustment circuits 41 to 43 are provided in such a way as to correspond to the first capacitors, respectively, in order to control the switching operations.

Moreover, voltage monitoring circuits 31 to 33 are provided in such a way as to correspond to the three first capacitors 21 to 23 in the first capacitor group 2, respectively, in order to monitor the charging voltages of the first capacitors 21 to 23. The charging voltages of the first capacitors, which are detected by the voltage monitoring circuits 31 to 33, are transferred to a switchover control circuit 5. The switchover control circuit 5 controls the switching operations of the switching circuits 71a to 73b through the switching adjustment circuits 41 to 43, on the basis of the transferred charging voltage of each of the first capacitors and a charging voltage of the second capacitor 6. Accordingly, the switchover control circuit 5 and the switching adjustment circuits 41 to 43 correspond to a connection control circuit according to the present invention. Moreover, an upper limit voltage control circuit (not shown) is provided beside the second capacitor 6. This upper limit voltage control circuit controls an upper limit voltage (e.g., 3 to 3.15 V) of the second capacitor 6 so that excessive voltage is not applied to the load circuit 15 in a case where accumulated energy is supplied to the load circuit 15. In this embodiment, accordingly, the second capacitor 6 is charged by the power source circuit 10 so as to be maintained at a state in which the second capacitor 6 is charged at an almost upper limit voltage.

During the operation of the voltage converting circuit 1, the first capacitor group 2 is in a state constantly connected to the power source circuit 10 as shown in FIG. 1. Therefore, each of the first capacitors is constantly charged by the power source circuit 10 in accordance with electric power supply (vibration electric power generation) from the vibration electric power generation device 11 in the power source circuit 10. Herein, charging efficiency between the vibration electric power generation device 11 and the first capacitor group varies depending on a ratio between an open-end voltage of the vibration electric power generation device 11 and a total charging voltage of the first capacitor group 2 (first voltage ratio).

Herein, the charging efficiency Ec1 between the vibration electric power generation device 11 and the first capacitor group is represented by the following equation.

Ec1=(amount of energy accumulated in first capacitor group per unit time)/(amount of electric power supplied(generated) by vibration electric power generation device 11 with matched resistance)

Figure 2A:
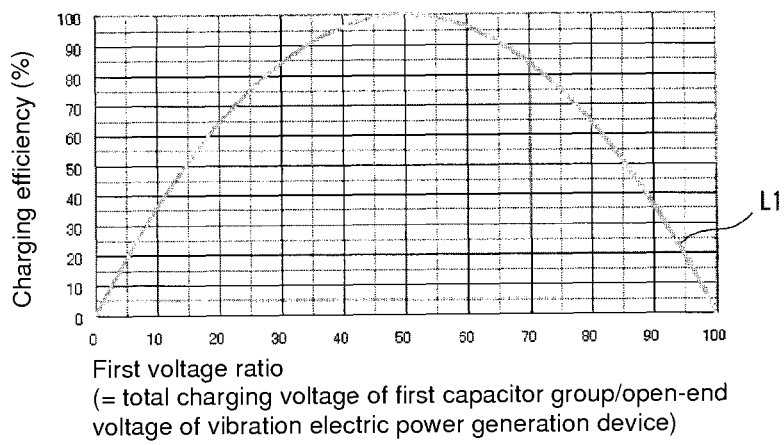
FIG. 2A is a first diagram showing a correlation between a ratio of a total charging voltage of a first capacitor group to an output voltage of a power source circuit and the efficiency of electrical-charging.

Plotting theoretical correlations between the charging efficiency Ec1 defined as described above and the first voltage ratio allows depiction of a parabola having an extreme value obtained when the first voltage ratio is 50% as shown with a line L1 in FIG. 2A. Accordingly, it is only necessary to determine the number of first capacitors to be included in the first capacitor group 2 so that the total charging voltage of the first capacitor group 2 is half of the open-end voltage of the vibration electric power generation device 11. Herein, the charging voltage of each of the first capacitors varies when electrical-discharging is carried out by the switching operation of the switching circuit 71a (which will be described later) or the like. Therefore, the total charging voltage of the first capacitor group 2 may be tentatively calculated as follows using an equation V1ave (=(V1+V1')/2) in which V1 represents a charging voltage at an initial phase of electrical-charging from one of the first capacitors (e.g., the first capacitor 21) to the second capacitor 6 by the switching operation in the first capacitor (a charging initial timing), V1' represents a charging voltage at a terminal timing of the same electrical-charging (a charging terminal timing), and V1ave represents an average value of the two voltages.

Total charging voltage of first capacitor group 2=n×V1ave (n: the number of first capacitors in first capacitor group 2, n=3 in this embodiment)

Typically, a capacitor to be available in the market has a capacity set at a specific value. Therefore, it is difficult to determine the number of first capacitors to be included in the first capacitor group 2 so that the total charging voltage of the first capacitor group 2 is exactly the half (50%) of the open-end voltage of the vibration electric power generation device 11 in some cases. In such a case, it is only necessary to determine the number of first capacitors to be included in the first capacitor group 2 so that the total charging voltage of the first capacitor group 2 approaches the half of the open-end voltage of the vibration electric power generation device 11 as soon as possible.

Figure 2B:
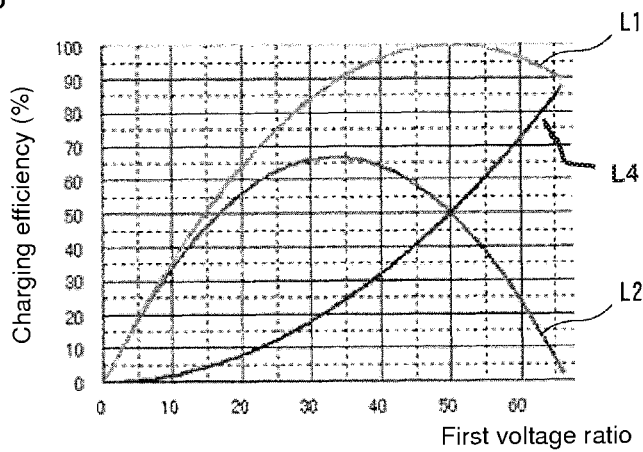
FIG. 2B is a second diagram showing the correlation between the ratio of the total charging voltage of the first capacitor group to the output voltage of the power source circuit and the efficiency of electrical-charging.
Figure 2C:
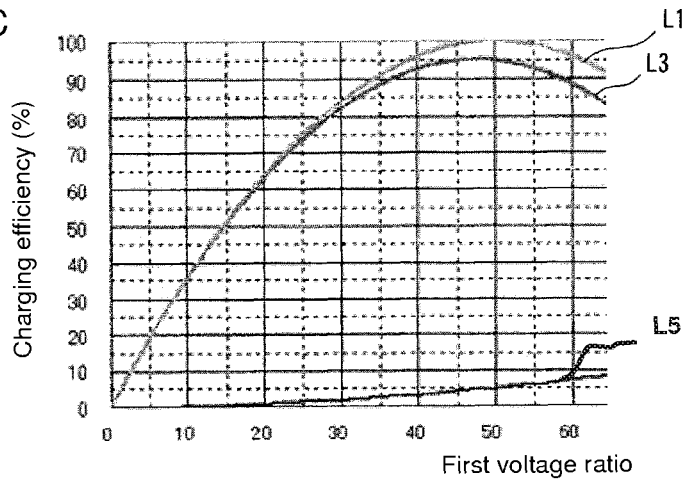
FIG. 2C is a third diagram showing the correlation between the ratio of the total charging voltage of the first capacitor group to the output voltage of the power source circuit and the efficiency of electrical-charging.

On the other hand, in a case where a load resistor is connected to the first capacitor group 2, the first voltage ratio at the time when the charging efficiency reaches the extremal value becomes lower than 50% as shown with a line L2 in FIG. 2B or a line L3 in FIG. 2C. FIG. 2B is a diagram showing transition of the charging efficiency in the state in which the load resistors to be connected to the first capacitors have a value of about 10 MΩ in the case where the vibration electric power generation device 11 to be used herein has an internal resistance of 10 MΩ to 20 MΩ. FIG. 2C is a diagram showing transition of the charging efficiency in the state in which the load resistors to be connected to the first capacitors have a value of about 100 MΩ in the case where the vibration electric power generation device 11 to be used herein is similar to that shown in FIG. 2B. For reference, a line L4 in FIG. 2B and a line L5 in FIG. 2C each indicate electric power consumption efficiency in the load resistor. The extreme value of the charging efficiency varies as described above because the first capacitor supplies energy to the load resistor connected thereto while accumulating energy therein. In the voltage converting circuit 1 shown in FIG. 1, the voltage monitoring circuits 31 to 33 are connected to the first capacitors in the first capacitor group 2, respectively, and correspond to the load resistors. In the voltage converting circuit 1, accordingly, it is only necessary to determine the number of first capacitors to be included in the first capacitor group 2 in consideration of the internal resistance of each of the voltage monitoring circuits 31 to 33.

Figure 3:
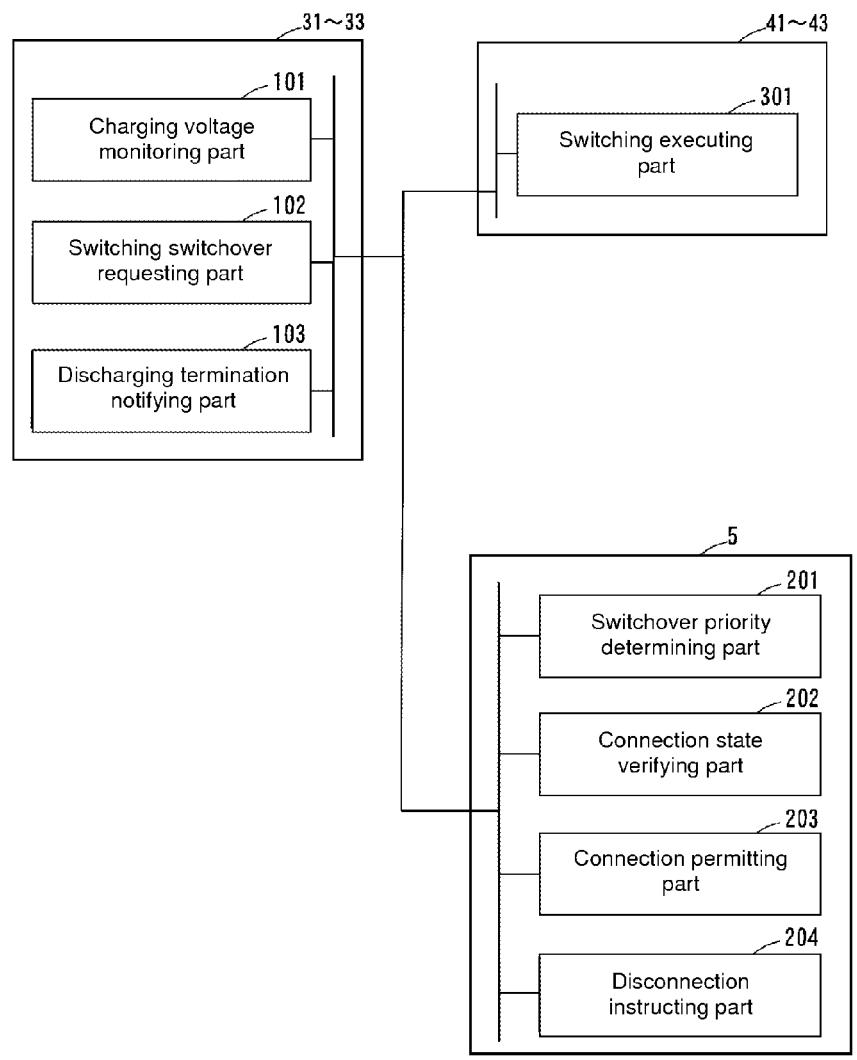
FIG. 3 is a functional block diagram showing images of functions to be exerted by the voltage converting circuit shown in FIG. 1.

With reference to FIG. 3, description will be given of a charging operation to be carried out from the vibration electric power generation device 11 to the second capacitor 6 in the voltage converting circuit 1 configured as described above. The charging operation is carried out by the switchover control circuit 5 together with the voltage monitoring circuits 31 to 33 and the switching adjustment circuits 41 to 43. Thus, the output voltage of the power source circuit 10 is stepped down to the charging voltage of the second capacitor 6 so as to correspond to the drive voltage of the load circuit 15. FIG. 3 is a functional block diagram showing images of functions to be exerted by the voltage monitoring circuits 31 to 33, the switching adjustment circuits 41 to 43 and the switchover control circuit 5. As a matter of course, each circuit may have a functional part other than the functional part shown in FIG. 3.

The voltage monitoring circuits 31 to 33 are configured with a charging voltage monitoring part 101, a switching switchover requesting part 102 and a discharging termination notifying part 103. The charging voltage monitoring parts 101 constantly monitor the charging voltages of the first capacitors 21 to 23 to which the voltage monitoring circuits 31 to 33 correspond respectively. A value of the charging voltage of each of the first capacitors, which is acquired by this monitoring, is transferred to the switchover control circuit 5 at an appropriate timing. The switching switchover requesting parts 102 switch the corresponding switching circuits 71a to 73b in order to transfer the energy stored in the first capacitors to the second capacitor 6, and issue switchover requests to the switchover control circuit 5 in order to connect the relevant first capacitors to the second capacitor 6. Herein, a condition that this switchover request is issued is a case where a correlation between the charging voltage of each of the first capacitors 21 to 23 and the charging voltage of the second capacitor 6 satisfies a predetermined condition, and the detailed description of the predetermined condition will be given later. Next, when the charging voltage of the first capacitor is reduced to a predetermined threshold value by the supply of electric power from the first capacitor to the second capacitor 6, the discharging termination notifying part 103 notifies the switchover control circuit 5 of the termination of electrical-discharging.

Next, the switchover control circuit 5 is configured with a switchover priority determining part 201, a connection state verifying part 202, a connection permitting part 203 and a disconnection instructing part 204. The switchover priority determining part 201 determines the priority of connections of the plurality of first capacitors 21 to 23 to the second capacitor 6 so that the plurality of first capacitors 21 to 23 are not simultaneously connected to the second capacitor 6 by the switching circuits 71a to 73b, that is, the first capacitors are not short-circuited with each other. Herein, the first capacitor serving as a target of the switchover priority determining part 201 is the first capacitor receiving the switchover request from the switching switchover requesting part 102. The connection state verifying part 202 verifies which first capacitor is connected to the second capacitor 6. The connection permitting part 203 permits the connection of the first capacitor to the second capacitor 6 on the basis of the status verified by the connection state verifying part 202. The disconnection instructing part 204 issues a disconnection instruction to the switching adjustment circuits 41 to 43 so as to disconnect the target first capacitor from the second capacitor 6, on the basis of the notification from the discharging termination notifying part 103.

Next, each of the switching adjustment circuits is configured with a switching executing part 301. The switching executing part 301 controls the switching operation of the corresponding one of the switching circuits 71a to 73b in accordance with a permission signal from the connection permitting part 203 or the disconnection instruction from the disconnection instructing part 204.

By virtue of the voltage monitoring circuits 31 to 33, the switchover control circuit 5 and the switching adjustment circuits 41 to 43, each of which is configured as described above, the second capacitor 6 is charged with the output voltage of the vibration electric power generation device 11 by execution of the following process in the voltage converting circuit 1. It is to be noted that an order of the following process items (1) to (5) is not limitative, but may be appropriately adjusted within a range which does not deviate from the gist of the present invention.

<Charging Process>

(1) An output current from the power source circuit 10 is stored in each of the first capacitors in the first capacitor group 2. Thus, the charging voltage of each of the first capacitors rises. The variations in charging voltage of the first capacitors are monitored by the charging voltage monitoring parts 101 of the corresponding voltage monitoring circuits.

(2) When the charging voltage of each of the first capacitors, which is monitored by the charging voltage monitoring part 101, reaches a predetermined connection voltage serving as a standard, the switching switchover requesting part 102 sends a switchover request to the switchover control circuit 5.

Herein, the predetermined connection voltage is determined so that efficiency of charge-transfer from each of the first capacitors to the second capacitor 6 is a favorable value when each of the first capacitors is connected to the second capacitor 6. With reference to FIG. 4, then, description will be given for the determination of the predetermined connection voltage. FIG. 4 shows, for each charging voltage of the capacitor, the efficiency of charge-transfer from the first capacitor to the second capacitor at the time when the first capacitor is connected to the second capacitor. This charge-transfer efficiency is theoretically calculated from the following equation.

$$\text{Charge-transfer efficiency} = (\text{increase in the amount of energy in second capacitor by connection})/(\text{decrease in the amount of energy in first capacitor})$$

In FIG. 4, an upper table (a) shows a case where the first capacitor and the second capacitor each have a capacity of 10 µF, and a lower table (b) shows a case where the first capacitor has a capacity of 1 µF and the second capacitor has a capacity of 10,000,000 µF. The charging voltage of each of the capacitors in an initial phase corresponds to the charging voltage at the timing of start of the connection, and the charging voltage of each of the capacitors in a terminal phase corresponds to the charging voltage at the timing of termination of the connection and then disconnection. As it is clear in FIG. 4, the charge-transfer efficiency tends to increase as a difference in voltage between the charging voltage of the first capacitor and the charging voltage of the second capacitor in the initial phase becomes small irrespective of the capacities of the first and second capacitors.

In this embodiment, therefore, it is assumed that the charge-transfer from the first capacitor to the second capacitor is carried out, that is, the switchover request is sent to the switchover control circuit 5 in a case where the difference in voltage between the first capacitor and the second capacitor is such a difference in voltage that the charging voltage of the first capacitor in the initial phase becomes about 1.1 to 1.2 times as large as the charging voltage of the second capacitor in the initial phase so that the efficiency of charge-transfer reaches about 85% or higher. More specifically, as described above, the upper limit voltage control circuit is provided beside the second capacitor 6 to maintain the charging voltage of the second capacitor 6 at about 3 to 3.15 V. In this embodiment, therefore, the predetermined connection voltage is set at about 3.3 V.

(3) The switchover priority determining part 201 determines the priority of connections of the first capacitors 21 to 23 to be connected to the second capacitor 6, in accordance with the switchover request from the switching switchover requesting part 102 of each of the voltage monitoring circuits. In principle, the connection priority is given in the order in which the switchover request is received. In a case where there is a possibility that the plurality of first capacitors are simultaneously connected in a period in which the states of connection are maintained, the connection priority is given in the order of the first capacitor 21, the first capacitor 22 and the first capacitor 23. The method for giving the connection priority is not limited to that described above. It is important to give the connection priority so that two or more first capacitors are not simultaneously connected to the second capacitor 6.

(4) The connection state verifying part 202 determines which first capacitor is connected to the second capacitor 6. When it is determined that no first capacitor is connected to the second capacitor 6, the connection permitting part 203 issues an instruction of permitting to connect the first capacitor, to which the highest connection priority is given, to the second capacitor 6 to the switching circuit corresponding to this first capacitor. Then, the switching executing part 301 of the switching circuit connects the first capacitor to the second capacitor 6. Thus, the second capacitor 6 is charged. On the other hand, when it is determined that any of the first capacitors is connected to the second capacitor 6, the connection permitting part 203, which issues an instruction of permitting the connection, is brought into a standby state until receiving a notification about termination of electrical-discharging from the discharging termination notifying part 103 of the voltage monitoring circuit corresponding to the first capacitor connected to the second capacitor 6.

The discharging termination notifying part 103 issues the notification about the termination of electrical-discharging at the time when the charging voltage of the first capacitor is approximate to the charging voltage of the second capacitor 6. When the discharging termination notifying part 103 issues the notification about the termination of electrical-discharging, the disconnection instructing part 204 issues a disconnection instruction for disconnecting the first capacitor from the second capacitor 6, to the switching circuit corresponding to the first capacitor connected to the second capacitor 6. When the switching circuit receives the disconnection instruction, the switching executing part 301 thereof disconnects the first capacitor from the second capacitor. At the same time as this disconnection, the switching circuit corresponding to the first capacitor to be connected to the second capacitor 6 next executes the connection between these capacitors.

In FIG. 5, an upper graph (a) shows state transition concerning the connection of the first capacitor to the second capacitor at the time of the connection or disconnection by the switching circuit. In this embodiment, a connection time constant $\Delta t1$ in a case where the switching executing part 301 brings the switching circuit into a connected state (an ON state) is set to be relatively longer than a disconnection time constant $\Delta t2$ in a case where the switching executing part 301 brings the switching circuit into a disconnected state (an OFF state). For example, "$\Delta t1$" is about 7 msec and "$\Delta t2$" is approximately 0 msec as soon as possible. As described above, the charge-transfer is carried out gently by setting the connection time constant to be relatively longer. Therefore, even in the case where one switching circuit carries out the disconnecting process while the different switching circuit carries out connecting process, it becomes possible to prevent the first capacitors corresponding to the respective switching circuits from being short-circuited with each other. As the result, even in the case where the disconnecting process by one switching circuit and the connecting process by the different switching circuit are carried out simultaneously, it is possible to substantially prevent the first capacitors from being short-circuited with each other.

As shown in a lower graph (b) of FIG. 5, on the other hand, both the connection time constant $\Delta t1$ and the disconnection time constant $\Delta t2$ are set to be approximately 0 msec as soon as possible. Herein, when the disconnecting process by one switching circuit and the connecting process by the different switching circuit are carried out simultaneously or when the two processes are carried out at considerably short intervals, there is a high possibility that the first capacitors are short-circuited with each other. In the voltage converting circuit 1 according to the present invention, particularly, it is important to set the connection time constant $\Delta t1$ and the disconnection time constant $\Delta t2$ each of which is able to prevent the first capacitors from being short-circuited with each other in consideration of a fact that it is crucial to connect substantially only one first capacitor to the second capacitor 6.

(5) The items (1) to (4) are carried out repeatedly as appropriate. Thus, the first capacitors having the charging voltage reaching the predetermined connection voltage are sequentially connected to the second capacitor so that the first capacitors are not short-circuited with each other. As the result, the second capacitor is charged in the state in which the efficiency of charge-transfer from the first capacitor to the second capacitor is maintained at 85% or higher. As described above, further, the charging efficiency from the vibration electric power generation device 11 to the first capacitor group 2 is also maintained at a favorable value. Therefore, the voltage dropping down efficiency and the charging efficiency from the vibration electric power generation device 11 to the second capacitor become considerably favorable as the entire voltage converting circuit 1. Moreover, the charge-transfer to the second capacitor is carried out while the charging voltage of each of the first capacitors is monitored. Therefore, appropriate electrical-charging to the second capacitor is realized even when the first capacitors are different in capacity from each other in some degree.

Figure 6:
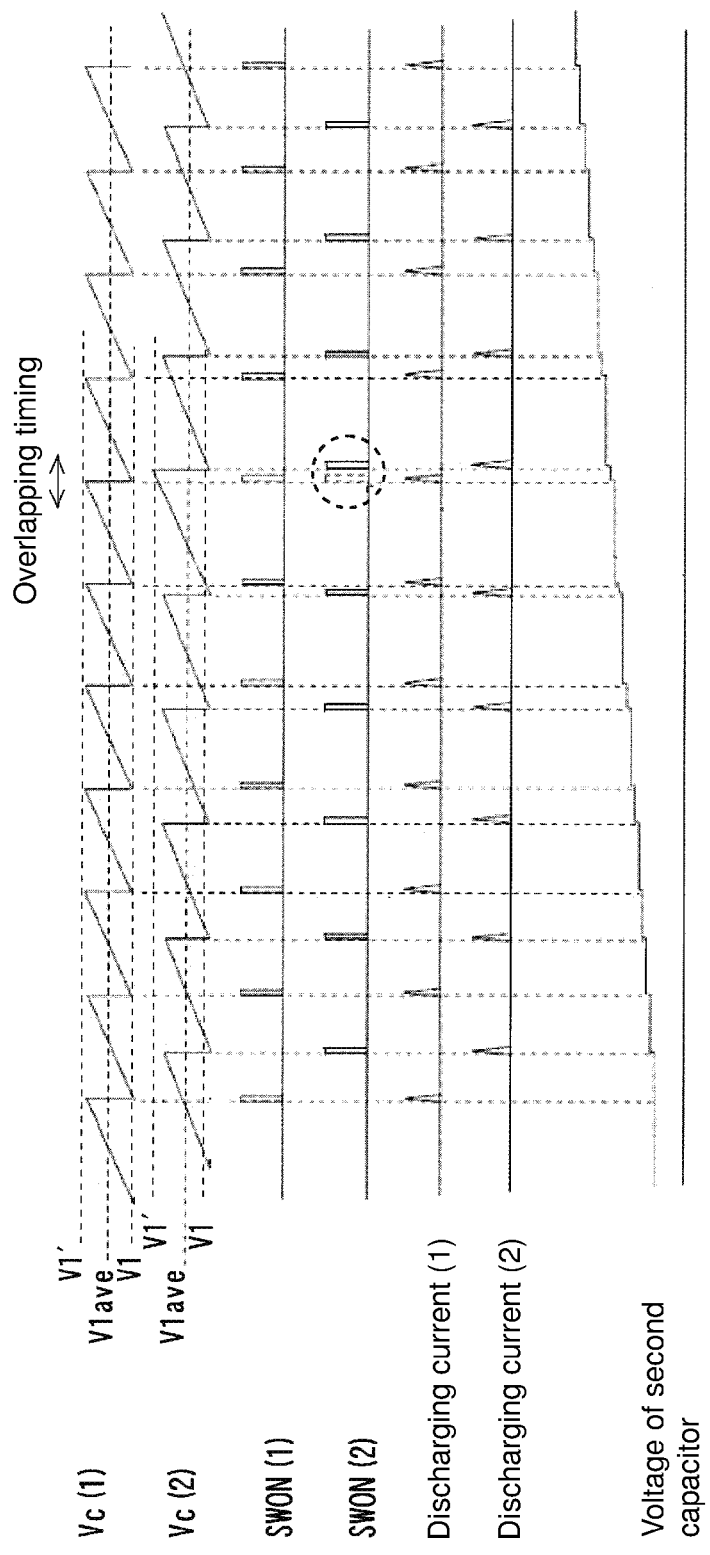
FIG. 6 is a timing chart showing the charging voltages of the first capacitors, ON signals from switching circuits, and transition of electric currents discharged from the first capacitors to the second capacitor, in the voltage converting circuit according to the present invention.

In consideration of the foregoing description, FIG. 6 shows a timing chart of the operations of the voltage converting circuit 1. To simplify the description, the number of first capacitors is two in this timing chart. In FIG. 6, upper two lines indicate transition of the charging voltages of the two first capacitors, next two lines indicate variation in the states of connection of the switching circuits corresponding to the two first capacitors, next two lines indicate transition of currents discharged from the two first capacitors to the second capacitor, and a lowermost line indicates transition of the charging voltage of the second capacitor. At an overlapping timing in FIG. 6, the voltage monitoring circuits corresponding to the two first capacitors simultaneously issue the switchover requests (see a dotted circle in FIG. 6). Therefore, the connection start timing of one of the first capacitors (the lower-side first capacitor) is intentionally shifted from the timing at which the switchover request is issued. Thus, it is possible to prevent the first capacitors from being short-circuited with each other. At this overlapping timing, energy is not discharged from the first capacitor of which the connection start timing is shifted, and this first capacitor is connected to the power source circuit 10. Therefore, the charging voltage of this first capacitor has a peak value which is slightly higher than a peak value of the charging voltage at a timing other than the overlapping timing.

In FIG. 7, an upper portion (a) shows a comparison between the charging efficiency of the entire voltage converting circuit 1 according to the present invention and charging efficiency of a voltage converting circuit according to the related art, and a lower portion (b) shows a schematic configuration of the voltage converting circuit according to the related art. According to the related art, an output voltage of a power source circuit is directly applied to a capacitor. As it is apparent from the upper portion (a) of FIG. 7, it is considered that the charging efficiency of the voltage converting circuit 1 according to the present invention exceeds 50%, which is considerably high, and is excellent in practical use.

Modified Example 1

In the foregoing embodiment, all the first capacitors in the first capacitor group 2 are identical in capacity with each other. Typically, a capacitor to be available in the market has a capacity limited to a specific value. On the condition that all the first capacitors are identical in capacity with each other, therefore, it is not necessarily easy to set the first voltage ratio at a predetermined value so that the efficiency of electrical-charging from the vibration electric power generation device 11 to the first capacitor group 2 is adjusted to be optimum as shown in FIGS. 2A to 2C. Hence, the capacities of part of the plurality of first capacitors in the first capacitor group 2, preferably, the capacity of one first capacitor (hereinafter, referred to as "first capacitor for adjustment") is set to be different from those of the remaining first capacitors (hereinafter, referred to as "standard first capacitor"). Thus, it is possible to further approximate the first voltage ratio to the predetermined value and to optimize the efficiency of electrical-charging from the vibration electric power generation device 11 to the first capacitor group 2.

In this case, the charging voltage of the first capacitor for adjustment at the time of the charge-transfer by the switching circuit should be higher than the charging voltage of the second capacitor 6. In order that the efficiency of charge-transfer from the standard first capacitor to the second capacitor 6 is set to be favorable, moreover, the foregoing correlation (charging voltage of standard first capacitor=charging voltage of second capacitor 6×1.1 to 1.2) is maintained between the charging voltage of the standard first capacitor and the charging voltage of the second capacitor 6. Therefore, there is a possibility that the correlation is no longer applicable between the charging voltage of the first capacitor for adjustment and the charging voltage of the second capacitor 6. However, since the efficiency of electrical-charging from the vibration electric power generation device 11 to the first capacitor group 2 is optimized by the use of the first capacitor for adjustment, the second capacitor 6 can be efficiently charged as the entire voltage converting circuit 1 in some cases.

Modified Example 2

In the foregoing embodiment, the second capacitor 6 is configured with one capacitor, but may be configured with a plurality of capacitors. Moreover, the capacitors may be connected in series or in parallel, and the connection mode of the capacitors may be a combination of the series connection and the parallel connection. With regard to the foregoing correlation between the charging voltage of each of the first capacitors and the charging voltage of the second capacitor 6, when such a correlation is established between the entire second capacitor configured with a plurality of capacitors and the first capacitor, efficient charge-transfer can be carried out from the first capacitor to the entire second capacitor. Moreover, when the connection mode between the load circuit 15 and the plurality of capacitors, with which the second capacitor is configured, is appropriately adjusted, the voltage converting circuit 1 is able to have a plurality of output voltages for the load circuit 15.

Embodiment 2

Figure 8:
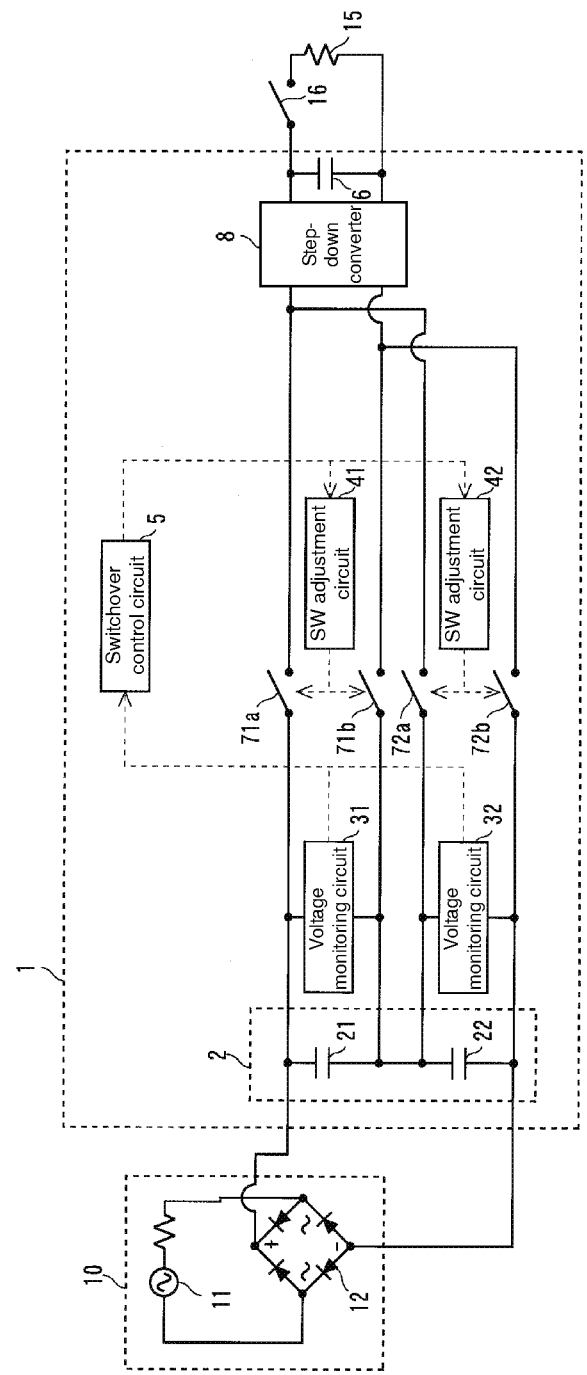
FIG. 8 is a second diagram showing a schematic configuration of the voltage converting circuit according to the present invention.

With reference to FIG. 8, description will be given of a second embodiment of the voltage converting circuit 1 according to the present invention. In the voltage converting circuit 1 according to this embodiment, as shown in FIG. 8, a step-down converter 8 is provided between the first capacitor group 2 and the second capacitor 6. Accordingly, a voltage stepped down by the first capacitor group 2 is input to the step-down converter 8. Then, the voltage is further stepped down by the step-down converter 8 and is input to the second capacitor 6. Typically, an amount of electric power to be consumed by the step-down converter 8 is relatively large. However, the step-down converter 8 is allowed to reduce the degree of a voltage drop in the first capacitor group 2. Therefore, it is possible to reduce the number of first capacitors to be included in the first capacitor group 2 and to realize size reduction of the circuit.

It is to be noted that the number of first capacitors in this embodiment is determined in such a way that the output voltage of the power source circuit 10 corresponds to the input voltage of the step-down converter 8. Herein, it is preferred that the voltage stepped down through the first capacitor group 2 is set at a value of the input voltage of the step-down converter 8 or is set at a value approximate to the input voltage within such a range that the operation of the step-down converter is not hindered. According to the configuration shown in FIG. 8, the step-down converter 8 allows reduction in number of the first capacitors to be included in the first capacitor group 2 from three in the foregoing embodiment to two.

Embodiment 3

In a third embodiment of the voltage converting circuit 1 according to the present invention, priority is given to reduction in size of the voltage converting circuit 1 rather than optimization of the efficiency of electrical-charging from the vibration electric power generation device 11 to the first capacitor group 2, and the number of first capacitors to be included in the first capacitor group 2 may be set in accordance with the size of the voltage converting circuit 1. In such a case, preferably, in order that the efficiency of charge-transfer between each of the first capacitors and the second capacitor is set to be favorable, the foregoing correlation (charging voltage of first capacitor=charging voltage of second capacitor 6×1.1 to 1.2) is maintained between the charging voltage of each of the first capacitors and the charging voltage of the second capacitor 6.

According to the present invention, as described above, a voltage converting circuit to be provided between an AC power source and a load circuit includes a plurality of first capacitors that are charged by the power source, and a second capacitor to which the first capacitors charged to a state higher than a charging voltage of the second capacitor are individually and sequentially connected. Thus, the second capacitor is charged with good efficiency.

More specifically, the present invention provides a voltage converting circuit including: a plurality of first capacitors that are charged by a power source; a second capacitor, connected in parallel to the plurality of first capacitors, which is able to be charged to a voltage equal to a voltage that is supplied to a load circuit; a plurality of switching circuits, provided in such a way as to correspond to the plurality of first capacitors respectively, each of which switches states of connection between its corresponding first capacitor and the second capacitor; and a connection control circuit for sequentially connecting the first capacitors to the second capacitor through the corresponding switching circuits as charging voltages of the first capacitors reach a predetermined connection voltage that is higher than a charging voltage of the second capacitor, and for controlling a state of connection of each of the first capacitors to the second capacitor so that the first capacitors are not short-circuited with each other.

In the voltage converting circuit, the plurality of first capacitors are charged by the power source, and the charging voltages of the first capacitors correspond to distributed or divided output voltages of the power source in accordance with capacities of the first capacitors. Herein, all the capacities of the plurality of first capacitors may be identical with each other. Alternatively, the capacities of part of or all the first capacitors may be different from each other.

The plurality of first capacitors are connected to the second capacitor through the switching circuits corresponding to the first capacitors respectively. That is, each of the first capacitors is individually connected to or disconnected from the second capacitor through its corresponding switching circuit. In the voltage converting circuit according to the present invention, the second capacitor may be configured to include one capacitor or a plurality of capacitors. It is important herein to adopt the configuration that the second capacitor is connected to or disconnected from the plurality of first capacitors through the switching circuits. It is only necessary to appropriately determine the number of capacitors with which the second capacitor itself is configured and to appropriately adopt a connection mode between the capacitors.

Herein, the connection or disconnection of each of the first capacitors to or from the second capacitor is controlled by the connection control circuit. In order to charge the second capacitor, the connection control circuit does not simultaneously connect all the plurality of first capacitors to the second capacitor, but determines, as a target to be connected to the second capacitor, the first capacitor of which charging voltage reaches the predetermined connection voltage that is higher than the charging voltage of the second capacitor. That is, the connection control circuit controls the connection or disconnection of the first capacitor to or from the second capacitor so as to realize suitable charging efficiency, in other words, suitable voltage conversion efficiency at the time of electrical-charging from the first capacitor to the second capacitor. As to the connection by the connection control circuit, further, the states of connection between the first capacitors and the second capacitor, each of which satisfies the foregoing conditions, are controlled so that the first capacitors are not short-circuited with each other for the following reason. That is, suitable electrical-charging to the second capacitor becomes difficult when the first capacitors are short-circuited with each other.

By the adoption of the configuration that the connection control circuit controls the states of connection between the first capacitors and the second capacitor in accordance with a correlation between the charging voltages of the plurality of first capacitors and the charging voltage of the second capacitor, even in the case where the variations in capacity of the first capacitors become relatively great, the connection to the second capacitor is controlled on the basis of the charging voltage of each of the first capacitors. Thus, it is possible to eliminate an influence due to the variations in capacity of the first capacitors from the electrical-charging to the second capacitor as soon as possible. By the control of the states of connection of the first capacitors so as to prevent the first capacitors from being short-circuited with each other, further, it is possible to realize electrical-charging to the second capacitor from the power source through the first capacitor and voltage conversion with suitable efficiency.

In the voltage converting circuit, the predetermined connection voltage may be a value of voltage that is higher than the charging voltage of the second capacitor, at which value of voltage a difference in voltage between the charging voltage of each of the first capacitors and the charging voltage of the second capacitor becomes such a difference in voltage that efficiency of charge-transfer from the first capacitor to the second capacitor reaches a predetermined level of efficiency or higher. That is, the predetermined connection voltage is determined in consideration of a fact that the difference in voltage between the charging voltage of each of the first capacitors and the charging voltage of the second capacitor exerts an influence on efficiency of charge-transfer from the first capacitor to the second capacitor. It can be found that the charge-transfer efficiency tends to decrease when the charging voltage of each of the first capacitors rises with respect to the charging voltage of the second capacitor, in other words, when the difference in voltage becomes large. This tendency does not change basically even when the first capacitor is different in capacity from the second capacitor. Therefore, it is preferred that the predetermined connection voltage for determination to be connected to the second capacitor by the connection control circuit is determined in consideration of the tendency of the charge-transfer efficiency. Experimentally, it is preferred that the predetermined connection voltage is about 1.1 to 1.2 times as large as the charging voltage of the second capacitor, at which voltage the predetermined efficiency becomes 85% or higher.

Herein, the voltage converting circuit may further include voltage monitoring circuits, provided in such a way as to correspond to the first capacitors respectively, each of which monitors the charging voltage of its corresponding first capacitor. In this case, the connection control circuit carries out connection control through the switching circuit in accordance with the charging voltages of the first capacitors as obtained by the voltage monitoring circuits, respectively. Thus, it is possible to favorably maintain the efficiency of electrical-charging from the first capacitor to the second capacitor.

In the voltage converting circuit, preferably, the connection control circuit sets a time constant required for each of the first capacitors to be connected to the second capacitor through its corresponding switching circuit to be longer than a time constant required for the first capacitor to be disconnected from the second capacitor through the switching circuit. When the connection time constant is set to be longer than disconnection time constant, charges are gradually transferred from the first capacitor. Therefore, the first capacitors are apt to be prevented from being short-circuited with each other when the connection control circuit sequentially connects the first capacitors to the second capacitor. Herein, it is only necessary to appropriately set the length of the connection time constant relative to the disconnection time constant in view of the prevention of short-circuit between the first capacitors. Moreover, it is preferred that the disconnection time constant is set at such a value that the first capacitor is disconnected from the second capacitor as soon as possible, in order to sequentially connect the first capacitors to the second capacitor with good efficiency.

By setting the connection time constant to be relatively long as described above, the connection control circuit may set the disconnection timing of the switching circuit corresponding to the first capacitor connected to the second capacitor to be the same timing as the connection timing of the switching circuit corresponding to the different first capacitor of which the charging voltage reaches the predetermined connection voltage. By setting the connection time constant as described above, it is possible to prevent the first capacitors from being short-circuited with each other even when the disconnection timing of one of the first capacitors is set to be the same timing as the connection timing of the different first capacitor.

In the voltage converting circuit, the number of the plurality of first capacitors may be such a number that a total charging voltage of the plurality of first capacitors falls within a voltage range corresponding to a predetermined percentage of open-end voltage of the power source, at which percentage a predetermined level of charging efficiency from the power source or higher is attained. The total charging voltage of the plurality of first capacitors rises in accordance with the number of first capacitors. With regard to electrical-charging from the power source to each of the first capacitors, it is theoretically known that when a ratio of the total charging voltage of the plurality of first capacitors to the open-end voltage of the power source (hereinafter, referred to as "first voltage ratio") is approximate to 50%, the efficiency of electrical-charging from the power source to the first capacitor has a generally favorable value (the predetermined charging efficiency). However, the first voltage ratio in which the charging efficiency is set at the predetermined charging efficiency varies because of an influence of internal resistance and the like in the power source and the plurality of first capacitors. Therefore, it is preferred that the predetermined percentage of the first voltage ratio is determined in consideration of this variation. Herein, the number of the plurality of first capacitors may be previously set in a fixed manner in accordance with the open-end voltage of the power source, and the like. Alternatively, the number may be adjusted in a variable manner in accordance with the change of the open-end voltage, and the like.

In the case where the voltage converting circuit includes the voltage monitoring circuit as described above, the internal resistance of this voltage monitoring circuit exerts an influence on the determination of the predetermined percentage. Therefore, it is preferred that the first voltage ratio for setting the charging efficiency at the predetermined charging efficiency is determined in consideration of the internal resistance of the voltage monitoring circuit.

In the voltage converting circuit, the number of the plurality of first capacitors is such a number that a total charging voltage of the plurality of first capacitors is less than or equal to half of an open-end voltage of the power source, the number being greater than or equal to 2. That is, it is possible to realize size reduction of the voltage converting circuit by reducing the number of first capacitors in consideration of the decrease of the efficiency of electrical-charging from the power source to each of the first capacitors.

Moreover, the voltage converting circuit may further include a step-down converter connected in parallel to the plurality of first capacitors and provided between the plurality of first capacitors and the second capacitor. In this case, the number of the plurality of first capacitors may be such a number that a total charging voltage of the plurality of first capacitors is approximate to an input voltage of the step-down converter. It is possible to realize an optimum design, particularly, size reduction of the voltage converting circuit while making full use of the characteristics of the step-down converter by adjusting the number of the plurality of first capacitors in accordance with the input voltage of the step-down converter.

In the voltage converting circuit, the power source may include a vibration electric power generation device that converts external vibration energy into electric power or may be a power source device that is able to supply different electric power.

The present invention may also be defined from an aspect of an electronic device including the foregoing voltage converting circuit. That is, the present invention provides an electronic device including the voltage converting circuit and the load circuit. Herein, the voltage converting circuit causes an output voltage of the power source to step down to a voltage that is supplied to the load circuit.

DESCRIPTION OF SYMBOLS

1 . . . Voltage converting circuit
2 . . . First capacitor group
5 . . . Switchover control circuit
6 . . . Second capacitor
8 . . . Step-down converter
10 . . . Power source circuit
11 . . . Vibration electric power generation device
12 . . . Rectification circuit
15 . . . Load circuit
21 to 23 . . . First capacitor
31 to 33 . . . Voltage monitoring circuit
41 to 43 . . . Switching adjustment circuit
71a, 71b . . . Switching circuit
72a, 72b . . . Switching circuit
73a, 73b . . . Switching circuit

The invention claimed is:
1. A voltage converting circuit comprising:
a plurality of first capacitors configured to be charged by a power source;
a second capacitor, connected in parallel to the plurality of first capacitors, capable of being charged to a voltage equal to a voltage that is supplied to a load circuit;
a plurality of switching circuits, configured to correspond to the plurality of first capacitors respectively, each switching circuit switches states of connection between its corresponding first capacitor and the second capacitor;
a connection control circuit configured to sequentially connect the first capacitors to the second capacitor through the corresponding switching circuits as charging voltages of the first capacitors reach a predetermined connection voltage that is higher than a charging voltage of the second capacitor, and control a state of connection of each of the first capacitors to the second capacitor so that the first capacitors are not short-circuited with each other; and voltage monitoring circuits, configured to correspond to the first capacitors respectively, each voltage monitoring circuit monitors the charging voltage of its corresponding first capacitor, wherein the connection control circuit carries out connection control through the switching circuits in accordance with the charging voltages of the first capacitors obtained by the voltage monitoring circuits.

2. The voltage converting circuit according to claim 1, wherein the predetermined connection voltage is a value of voltage that is higher than the charging voltage of the second capacitor, at which value of voltage a difference in voltage between the charging voltage of each of the first capacitors and the charging voltage of the second capacitor becomes such a difference in voltage that efficiency of charge-transfer from the first capacitor to the second capacitor becomes equal to or greater than a predetermined level of efficiency.

3. The voltage converting circuit according to claim 1, wherein the connection control circuit sets a time constant required for each of the first capacitors to be connected to the second capacitor through its corresponding switching circuit to be longer than a time constant required for the first capacitor to be disconnected from the second capacitor through the switching circuit.

4. The voltage converting circuit according to claim 3, wherein the connection control circuit causes one of the first capacitors to be disconnected from the second capacitor through its corresponding switching circuit at the same time as another one of the first capacitor whose charging voltage has reached the predetermined connection voltage is connected to the second capacitor through its corresponding switching circuit.

5. The voltage converting circuit according to claim 1, wherein the number of the plurality of first capacitors is such a number that a total charging voltage of the plurality of first capacitors falls within a voltage range corresponding to a predetermined percentage of open-end voltage of the power source, at which percentage a predetermined level of charging efficiency from the power source or higher is attained.

6. The voltage converting circuit according to claim 1, wherein:

the number of the plurality of first capacitors is such a number that a total charging voltage of the plurality of first capacitors falls within a voltage range corresponding to a predetermined percentage of open-end voltage of the power source, at which percentage a predetermined level of charging efficiency from the power source or higher is attained; and the predetermined percentage is determined in accordance with an internal resistance of each of the voltage monitoring circuits.

7. The voltage converting circuit according to claim 1, wherein the number of the plurality of first capacitors is such a number that a total charging voltage of the plurality of first capacitors is less than or equal to half of an open-end voltage of the power source, the number being greater than or equal to 2.

8. The voltage converting circuit according to claim 1, further comprising a step-down converter connected in parallel to the plurality of first capacitors and provided between the plurality of first capacitors and the second capacitor, wherein the number of the plurality of first capacitors is such a number that a voltage stepped down through the plurality of first capacitors is approximate to an input voltage of the step-down converter.

9. The voltage converting circuit according to claim 1, wherein the power source includes a vibration electric power generation device that converts external vibration energy into electric power.

10. The voltage converting circuit according to claim 2, wherein the predetermined level of efficiency is such a value that the efficiency of charge-transfer from the first capacitor to the second capacitor is equal to or greater than 85%.

11. An electronic device comprising:
a voltage converting circuit according to claim 1; and
a load circuit; wherein
the voltage converting circuit causes an output voltage of the power source to step down to a voltage that is supplied to the load circuit.

* * * * *